United States Patent
Thörn et al.

(10) Patent No.: US 9,672,387 B2
(45) Date of Patent: Jun. 6, 2017

(54) OPERATING A DISPLAY OF A USER EQUIPMENT

(71) Applicant: Sony Corporation, Tokyo (JP)

(72) Inventors: Ola Thörn, Limhamn (SE);
Pär-Anders Aronsson, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 208 days.

(21) Appl. No.: 14/414,229

(22) PCT Filed: Apr. 28, 2014

(86) PCT No.: PCT/IB2014/061042
§ 371 (c)(1),
(2) Date: Jan. 12, 2015

(87) PCT Pub. No.: WO2015/166299
PCT Pub. Date: Nov. 5, 2015

(65) Prior Publication Data
US 2016/0275314 A1     Sep. 22, 2016

(51) Int. Cl.
*G06F 21/62*     (2013.01)
*G06F 21/60*     (2013.01)
(Continued)

(52) U.S. Cl.
CPC .............. *G06F 21/84* (2013.01); *G06F 3/013* (2013.01); *G06F 3/0481* (2013.01); *G06F 21/10* (2013.01);
(Continued)

(58) Field of Classification Search
None
See application file for complete search history.

(56) References Cited

U.S. PATENT DOCUMENTS 6,785,406 B1 *   8/2004   Kamada ............. G06K 9/00597
                                                    340/5.53
8,539,560 B2 *   9/2013   Angaluri ............. H04N 9/3194
                                                    434/314
(Continued)

OTHER PUBLICATIONS

International Search Report and Written Opinion; Oct. 23, 2014; issued in International Patent Application No. PCT/IB2014/061042.
(Continued)

*Primary Examiner* — Dismery Mercedes
(74) *Attorney, Agent, or Firm* — James C. Edwards; Moore & Van Allen, PLLC

(57) ABSTRACT

Operating a display of a user equipment. The present invention relates to a method for operating a display (2) of a user equipment (1). The display (2) is configured to display an object (50). A permission is assigned to the object (50), which defines an allowance for a person (11-13) to view the object (50). According to the method, a gaze position (63) of a person (12) looking at the display (2) is determined, which defines a position on the display (2) at which the person (12) is looking. A distance between the gaze position (63) and a position of the object (50) is determined and furthermore, it is determined, if the person (12) is allowed to view the object based on the permission assigned to the object (50). If the person (12) is not allowed to view the object (50), the object (50) is concealed depending on the determined distance between the gaze position (63) and the position of the object (50).

11 Claims, 3 Drawing Sheets

(51) Int. Cl.
  G06F 21/32    (2013.01)
  G06K 9/00     (2006.01)
  G06F 21/84    (2013.01)
  G06F 21/10    (2013.01)
  H04N 13/04    (2006.01)
  G06F 3/01     (2006.01)
  G06F 3/0481   (2013.01)
  G06F 21/50    (2013.01)
  G06F 21/64    (2013.01)

(52) U.S. Cl.
  CPC .............. *G06F 21/32* (2013.01); *G06F 21/60* (2013.01); *G06F 21/6245* (2013.01); *G06K 9/00597* (2013.01); *G06K 9/00604* (2013.01); *H04N 13/0484* (2013.01); *G06F 21/50* (2013.01); *G06F 21/645* (2013.01); *G06F 2221/032* (2013.01)

(56) References Cited

U.S. PATENT DOCUMENTS

| | | | | |
|---|---|---|---|---|
| 8,594,374 B1* | 11/2013 | Bozarth | ................ | G06F 21/36 |
| | | | | 382/103 |
| 8,754,829 B2* | 6/2014 | Lapstun | ............ | H04N 13/0402 |
| | | | | 345/419 |
| 8,863,008 B2* | 10/2014 | Chan | .................... | G06F 21/606 |
| | | | | 345/626 |
| 8,922,480 B1* | 12/2014 | Freed | ...................... | G09G 5/00 |
| | | | | 345/156 |
| 8,973,149 B2* | 3/2015 | Buck | ...................... | G06F 21/50 |
| | | | | 726/26 |
| 8,984,622 B1* | 3/2015 | Baldwin | ................ | G06F 21/32 |
| | | | | 726/16 |
| 9,075,974 B2* | 7/2015 | Barr | ....................... | G06F 21/32 |
| 9,208,753 B2* | 12/2015 | Chan | ...................... | G09G 5/30 |
| 2006/0114328 A1 | 6/2006 | Kim et al. | | |
| 2006/0210167 A1* | 9/2006 | Inoue | ...................... | G06F 21/32 |
| | | | | 382/190 |
| 2009/0141895 A1 | 6/2009 | Anderson et al. | | |
| 2010/0205667 A1* | 8/2010 | Anderson | ............... | G06F 3/013 |
| | | | | 726/19 |
| 2013/0254874 A1* | 9/2013 | Xu | ......................... | G06F 21/32 |
| | | | | 726/17 |
| 2014/0168056 A1* | 6/2014 | Swaminathan | .... | G06K 9/00604 |
| | | | | 345/156 |
| 2015/0003691 A1* | 1/2015 | Joo | .................... | G06K 9/00604 |
| | | | | 382/117 |

OTHER PUBLICATIONS

Frederik Brudy: "Is Anyone Looking? Mitigating Shoulder Surfing on Public Displays through Awareness and Protection", Mar. 11, 2014, pp. 1-75, XP055143826, Retrieved from the Internet: URL:http://grouplab.cpsc.ucalgary.ca/grouplab/uploads/Publications/Publications/2014-Brudy.MSc.pdf [retrieved on Oct. 1, 2014] chapter 4.3; figure 4.19.

* cited by examiner

OPERATING A DISPLAY OF A USER EQUIPMENT

TECHNICAL FIELD

The present invention relates to a method for operating a display of a user equipment, especially to a method for avoiding that a user who has no permission to look at a certain object, which is to be displayed on the display, can see the object. The present invention relates furthermore to a user equipment implementing the method.

BACKGROUND ART

More and more of information of our daily life is stored digitally and becomes easier to share with other people. For example, images and videos may be stored on a user equipment, for example a tablet PC, a desktop PC, a mobile telephone, especially a smartphone or a media center in a living room, and may be available to be viewed on a display of the tablet PC or desktop PC or on a TV flatscreen. In this case, several people are enabled to watch the information stored. The same may occur in case of a flatscreen collaboration surface in an office environment. There may be some information to share, but other information that is not to share. This could be in a social context or in a working context, for example with customers or suppliers.

For example, some people are sitting in front of or around a collaborative surface where both, an owner of the information and collaborators, are looking at. The collaborative surface may comprise for example a display of a tablet PC or a flatscreen arranged in a table or at a wall. The owner of the information would like to share a picture but would like to avoid to browse through all pictures which may comprise private pictures of a journey or a party. With the current user interfaces this becomes difficult in contrast to traditional methods like searching photos in a photo box or a photo album where it is easier to skip parts or to occlude parts that should not be shared.

Therefore, there is a need for an improved display method.

SUMMARY

According to the present invention, this object is achieved by a method for operating a display of a user equipment as defined in claim 1 and a user equipment as defined in claim 13. The dependent claims define preferred and advantageous embodiments of the invention.

According to an aspect of the present invention, a method for operating a display of a user equipment is provided. The display of the user equipment is configured to display an object, for example an image or a video or a thumbnail of an image or a video, and a permission is assigned to the object. The permission defines an allowance for a person to view the object. For example, the permission may define a plurality of user identifiers related to single persons or to groups of persons. According to the method, a gaze position of a person looking at the display is determined. The gaze position defines a position on the display at which the person is currently looking. Furthermore, a distance between the gaze position and a position of the object is determined. Based on the permission which is assigned to the object, it is determined if the person is allowed to view the object. If the person is not allowed to view the object, the object is concealed depending on the determined distance between the gaze position and the position of the object. In other words, if the person is not allowed to view the object, the object may automatically be concealed when the person is looking at the position of the object or at a position near the object. Thus, privacy of an object like a photo or a video may be assured.

According to an embodiment, a gaze area radius is determined based on the gaze position and a predefined sharp vision viewing angle of the person. For a human being, a sharp vision viewing angle is typically only a few degrees, especially about two degrees, and the experience of sharp vision over a larger area is simulated by the brain. Thus, a sharp vision of the object can be obtained by a person only when the person is looking at the object directly or when the object is at least within the area covered by the sharp vision viewing angle. The object is concealed, when the distance between the gaze position and the position of the object is smaller than the gaze area radius. Therefore, the object is concealed only, when the person who is not allowed to view the object has actually the ability to look at the object. In case the person who is not allowed to view the object is looking at the object only peripherally, the object need not to be concealed, as in this case the person is not able to get a sharp vision of the object. This enables that persons, who are allowed to view the object, may have an unconcealed to the object most of the time.

According to an embodiment, for concealing the object the object may be blurred. A degree of the blurring may be a monotonic function of the distance between the gaze position and the position of object. The degree of blurring increases when the distance becomes smaller. This gradual blurring of the object allows a limited area of the display surface to be used more efficiently while also giving a subtle indication that a gaze of a person who is not allowed to look at the object is coming closer to the object. The object may be completely blurred or only partly. Additionally or as an alternative, for concealing the object, the object may be removed from the display. Furthermore, as an alternative, the object may at least partly be obscured. Additionally, an output may be displayed on the display, for example partly or completely covering the object, indicating that a gaze position of a person which has no permission to view the object is approaching the object.

According to an embodiment, for determining the gaze position of the person looking at the display, a visual center of the person looking at the display is determined and the position of the display which is in the visual center is determined as the gaze position. For example, an image of the eyes of the person may be captured. The image may comprise light (corneal reflections) which is reflected from a corneal of the eye of the person. A center position of a pupil of the eye may then be determined in this image, and based on the center of the pupil the gaze position of the person looking at the display may be determined.

According to an embodiment, for determining if the person is allowed to view the object, an image of an iris of the person is captured and an identifying information for the person is determined based on the image of the iris. Based on the permission assigned to the object and the identifying information for the person is determined, if the person is allowed to view the object. Identification using the iris is a very secure method for identifying a person. The iris pattern is stable over time and is unique for every person including twins and even unique for each eye of the same person. As for determining the gaze position, the eye of the person has to be captured anyway, iris identification may be performed with low additional effort.

According to an embodiment, the eye of the person may be illuminated with light of a predetermined spectrum. The predetermined spectrum may comprise for example infrared light. By use of infrared light an adequate illumination of the eye for determining the gaze position and the iris image may be provided without the user noticing the illumination of the eyes.

According to a further embodiment, for capturing the image of the iris of the person, the eye of the person is illuminated subsequently from a plurality of different directions. While the eye of the person is illuminated from the plurality of different directions, a plurality of images of the iris of the person is subsequently captured. For example, the eye of the person may be illuminated subsequently from nine different directions, for example from nine differently arranged light sources, and for every illumination direction a corresponding image of the iris is captured. The image of the iris is determined by combining the captured plurality of images. When using for example infrared light sources, for example infrared light emitting diodes (LED), reflections may be generated in the cornea. Such reflections may cover or obscure details in the iris and thus make the identification of the person via the above-described iris identification less reliable. By using a number of differently located infrared LEDs and switching between them it is possible to combine several images using for example feature extraction algorithms, to create an image without or with less of the corneal reflections being present. The plurality of different light sources can be used both for determining the gaze position and for iris identification.

According to an alternative embodiment, the complexity may be reduced if not the plurality of images is combined, but instead those areas in the image, where there is a reflection caused by the known light sources and/or a reflection from any other light source, e.g. a house-hold lamp or the sun, are ignored for the identification process.

According to an embodiment, the object comprises for example a photo, a video or a document. The photo, video or document may comprise personal information or information which should be restricted to a predefined group of people. By concealing the photo, video or document in case a person having no permission to view the photo, video or document is trying to look at the photo, video or document, such information may be protected during collaboration.

According an embodiment, the above-described methods are automatically performed by the user equipment. For example, a processing unit in combination with cameras of the user equipment may perform the above-described methods. Thus, even when a large group of persons is looking at the display, each person may be monitored and each object displayed on the display may be concealed automatically and immediately in case a not authorized person is looking at the object.

According to another aspect of the present invention, a user equipment is provided. The user equipment comprises a display, a capturing device and a processing unit. The display may be used to display an object. The object may comprise for example an image, a video or a document or a thumbnail of the image or a thumbnail related to a content of the video. A permission is assigned to the object which defines an allowance for a person to view the object. The capturing device, e.g. a camera or a plurality of cameras, is configured to capture an image of an eye of a person looking at the display. The processing unit is configured to determine a gaze position of the person looking at the display based on the captured image of the eye of the person. The gaze position defines a position on the display at which the person is looking. Based on the gaze position, the processing unit determines a distance between the gaze position and a position at which the object is displayed on the display. Furthermore, the processing unit is configured to determine if the person who is looking at the display is allowed to view the object based on the permission assigned to the object. If the processing unit determines that the person is not allowed to view the object, the processing unit conceals the object depending on the determined distance between the gaze position and the position of the object. For example, the processing unit may conceal the object when the distance between the gaze position and the position of the object is smaller than a predetermined distance. The predetermined distance may depend on a distance between a surface of the display and the eye of the person.

The user equipment may be configured to perform the above-described methods and comprises therefore also the above-described advantages. Furthermore, the user equipment may comprise for example a mobile telephone, a smartphone, a person digital assistant, a mobile media player, a tablet computer, a projector device, a television set, a portable computer, or a computer with a flat screen arranged in a desk or at a wall as a collaboration surface.

Although specific features described in the above summary and the following detailed description are described in connection with specific embodiments and aspects of the present invention, it should be noted that the features of the embodiments and aspects described herein may be combined with each other unless specifically noted otherwise.

BRIEF DESCRIPTION OF DRAWINGS

The present invention will now be described with reference to the accompanying drawings.

DESCRIPTION OF EMBODIMENTS

In the following, exemplary embodiments of the present invention will be described in more detail. It is to be understood that the features of the various exemplary embodiments described herein may be combined with each other unless specifically noted other wise.

Figure 1:
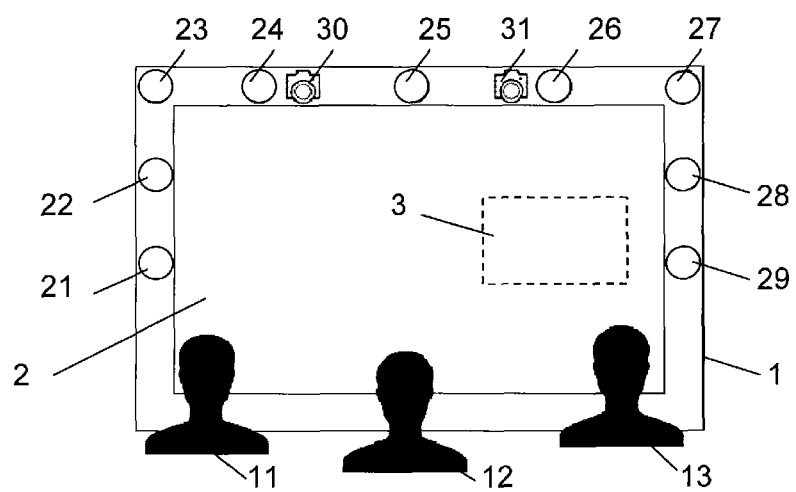
FIG. 1 shows schematically a user equipment according to an embodiment of the present invention.

FIG. 1 shows schematically a user equipment 1. The user equipment 1 may comprise for example a mobile telephone, for example a so-called smartphone, a tablet PC, a computer monitor or a flatscreen of a home entertainment system or a flatscreen of a collaborating surface arranged for example at a wall or in a desk in an office. The user equipment 1 comprises a display 2, for example a liquid crystal display, on which information for persons 11-13 looking at the user equipment 1 may be presented. The information presented on the display 2 may comprise for example photos, images, drawings, charts, diagrams, videos or text documents or a combination thereof. The user equipment 1 comprises furthermore a plurality of illumination devices 21-29 which are arranged near and around the display 2 and configured to illuminate the faces of persons 11-13 when persons 11-13 are looking at the display 2. Furthermore, the user equipment 1 comprises a plurality of camera devices 30, 31 arranged near the display 2 and configured to capture images of the faces of the persons 11-13 when the persons 11-13 are looking at the display 2. The illumination devices 21-29 may comprise for example infrared illumination devices, for example infrared light emitting diodes (IR LED), for illuminating the faces of the persons 11-13. By using infrared light for the illumination, the persons 11-13 will not notice the illumination and will not be disturbed by the illumination. The capturing devices 30, 31, for example digital cameras, may be configured to receive infrared light such that the capturing devices 30, 31 may capture images of the faces of the persons 11-13 and more particular the eyes of the persons 11-13. By using infrared light for capturing the faces and eyes of the persons 11-13, the capturing may be independent from ambient light in an environment of the user equipment and the persons 11-13. The user equipment 1 comprises furthermore a processing unit 3 controlling the illumination devices 21-29, receiving information from the capturing devices 30, 31 and controlling an output on the display 2.

In an exemplary embodiment, the user equipment 1 may comprise a collaborative surface which may be arranged in a desk and persons 11-13 may be sitting around the desk looking at the collaborative surface. Each of the persons 11-13 may have access to their own information on the surface which may be represented as images, icons or the like representing files on the display 2. Some of these objects may provide a preview in form of a so-called thumbnail or some of the objects may be opened displaying the content in full detail on the display 2. However, not every information object displayed on the display 2 shall be visible to each of the persons 11-13. For example, person 11 is searching for a picture which the person 11 wants to show the persons 12 and 13. However, while browsing through several folders of a file system, person 11 may have to look into a lot of image files to find the picture. These files may comprise information which is not intended to be seen by persons 12 and 11. To accomplish this, the user equipment 1 is configured to perform the method shown in FIG. 2.

Figure 2:
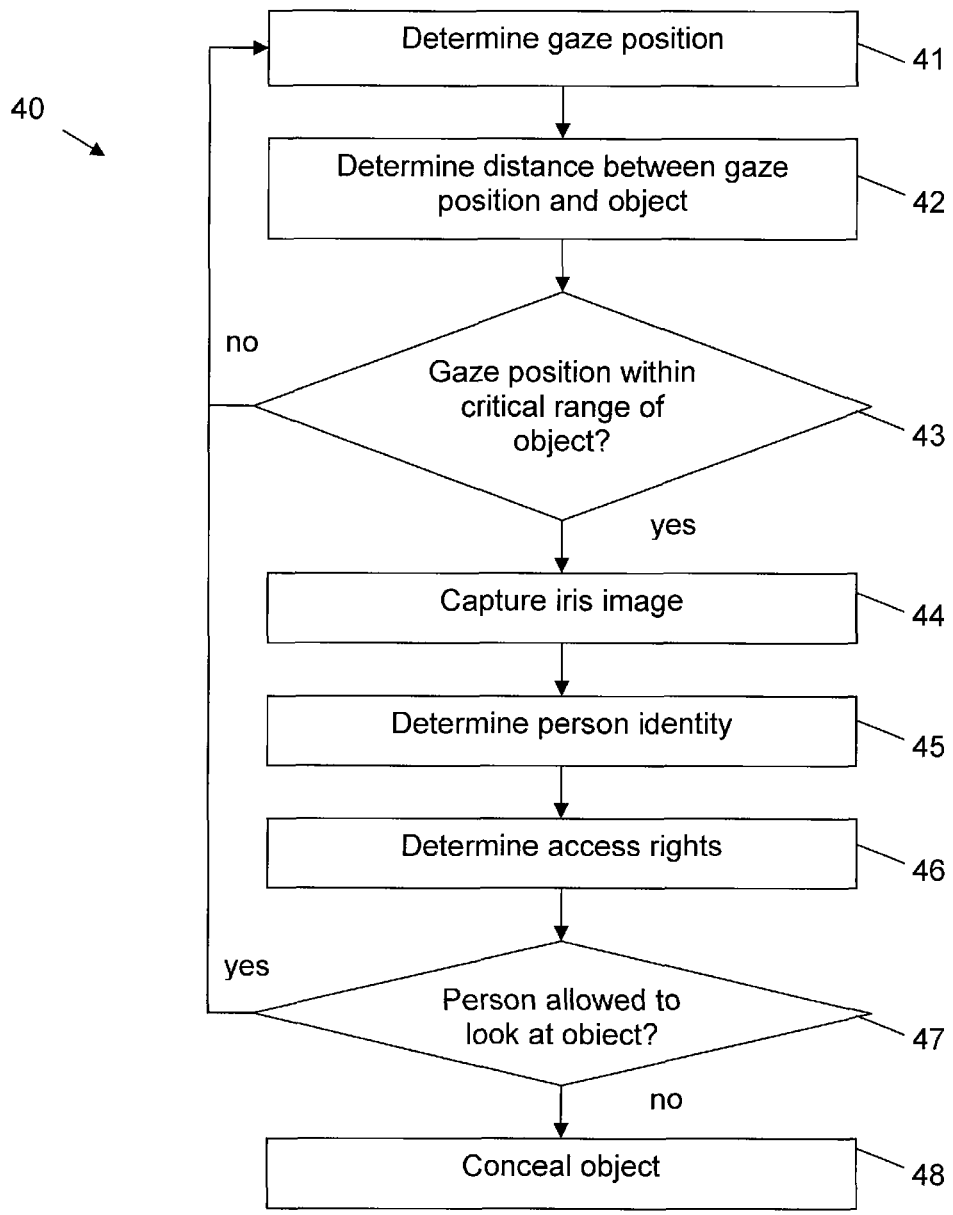
FIG. 2 shows schematically method steps of a method according to an embodiment of the present invention.

FIG. 2 shows a method 40 comprising method steps 41-48. The method 40 will be explained in connection with FIGS. 3 and 4 which show the person 12 looking at the user equipment 1 in a perspective side view. On the display 2 of the user equipment 1 an object 50 is displayed. The object 50 may comprise an image or a picture and may belong for example to person 11. Person 11 has assigned access rights to the object 50. The object 50 may contain information which should not be visible to person 12 and therefore the assigned access rights for watching the object 50 are very restrictive. Especially, person 12 has no permission to view the object 50.

Figure 3:
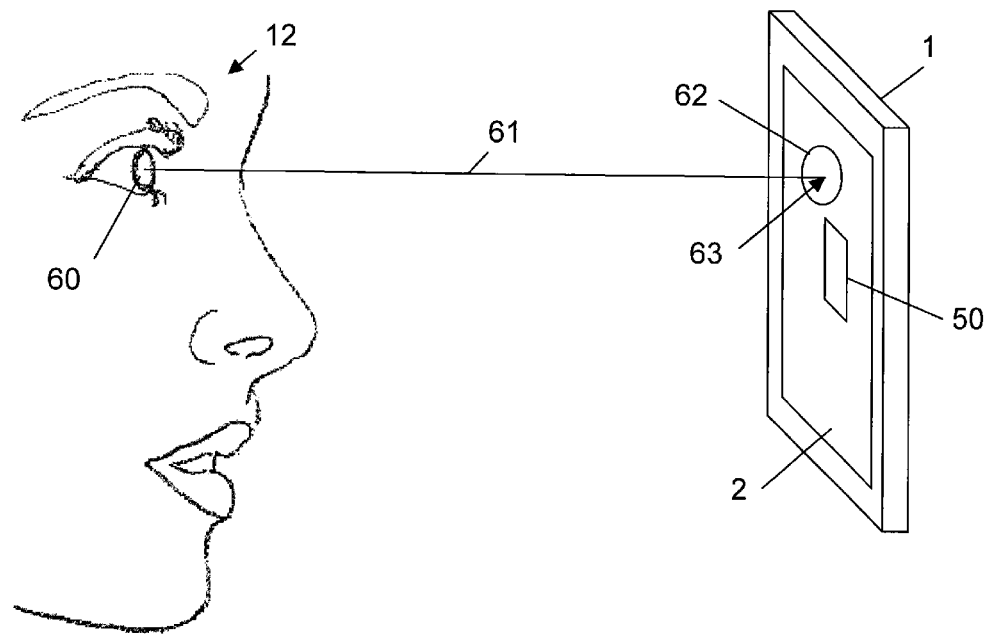
FIG. 3 shows a person looking at a display of the user equipment of FIG. 1

The sharp vision of a person who is looking into a certain direction is only about two degrees. The experience of sharp vision over a larger area is simulated by the brain when the eye of the person, for example the eye 60 of the person 12 is moved. However, when the person 12 is looking in a certain direction, for example the direction 61 shown in FIG. 3, there is only a small sharp vision area 62 which depends on the direction 61 and a distance between the user equipment 1 and the eye 60 of the person 12. Therefore, in step 41 the processing unit 3 of the user equipment 1 determines a current gaze position of the user 12 on the display 2. In FIG. 3, the gaze position is indicated by reference sign 63. For determining the gaze position, the face or at least the eyes of the person 12 are illuminated with the illumination devices 21-29 and an image of face of the user 12 is captured with the capturing devices 30 and 31. Based on the images captured by the capturing devices 30 and 31 the gaze direction 61 may be determined, for example from corneal reflections from the illumination devices 21-29 together with a center position of the pupil of the eye 60. Next, in step 42 a distance between the gaze position 63 and the object 50 is determined. When in step 43 the gaze position is not within a critical range of the object 50, the person 12 is not looking directly at the object 50 and can therefore not receive a sharp vision image of the object 50. Therefore, in this case there is no danger that the person 12 can see information which is not intended to be seen by the person 12. However, when the distance between the gaze position 63 and the object 50 is critical, the method continues in step 44.

Figure 4:
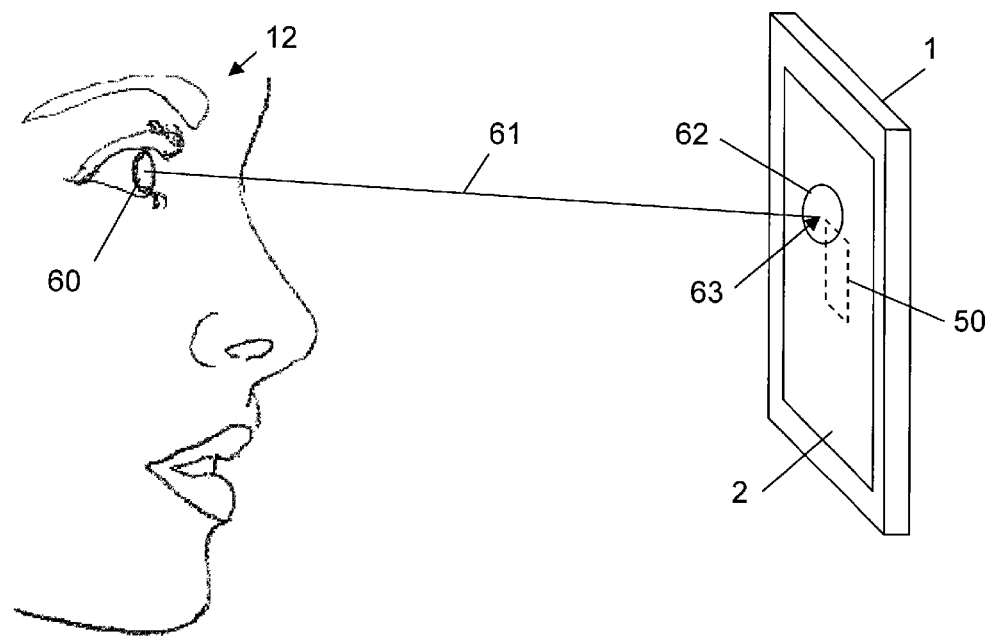
FIG. 4 shows a user looking at another position on the display of the user equipment of FIG. 1.

FIG. 4 shows a gaze position 64 which is within a critical range of the object 50. For example, the above-described sharp vision area 62 surrounding the gaze position 63 may be determined and when the sharp vision area 62 covers the object 50 at least partly, it is determined in step 43 that the gaze position 63 is within the critical range of the object 50. In this case, in step 44 an iris image of the eye 60 of the person 12 is captured or determined based on the previously captured images for determining the gaze position. The corneal reflections which were useful for determining the gaze direction and the gaze position 63, may cover or disturb details in the iris. Therefore, the illumination devices 21-29 may be switched on and off one after the other and a plurality of iris images may be captured for each illumination device 21-29 being switched on. Then, the plurality of iris images may be combined into one image in which the corneal reflections are removed. In step 45 the identity of the person 12 is determined based on the iris image. Based on the identity of the person 12 and the permission assigned to the object 50, access rights for the person 12 to look at the object 50 are determined in step 46. If the person 12 is allowed to look at the object 50 (step 47) no further action is needed and the method 40 may be continued in step 41. However, when the person 12 is not allowed to look at the object 50, the object 50 is concealed in step 48.

In FIG. 4 concealing the object is indicated by the dashed lines of the object 50. Concealing the object 50 may comprise for example blurring the object 50 at least partly, removing the object 50 from the display 2 or obscuring the object 50. Furthermore, a notification may be output on the display 2 indicating that person 12 is looking at object 50. This information may be useful for the owner of the object 50 (for example person 11) or may cause the person 12 to look away from the object 50.

To sum up, the user equipment 1 will behave as described in the following. Naturally, since person 11 is the owner of object 50 and has permission to look at object 50, object 50 will be visible for person 11 when only person 11 is watching it. However, if person 12 is also looking straight at object 50, the user equipment 1 will for example completely stop showing the object 50 and instead present a message that object 50 is private. In the peripheral vision of person 12, i.e. outside the sharp vision area, person 12 will have a very blurry view of the object 50 only. However, the view of the object 50 will be become less blurry the closer the gaze of person 12 is to the private object 50. In order to compensate for this, the user equipment 1 may gradually blur the object 50 the closer the gaze of person 12 comes. This gradual blurring of the object 50 allows the limited area of the surface to be used more efficiently while also giving person 11 an indication that a gaze of another person is coming closer. Optionally, person 12 may also be notified by using for example icons, that the look of person 12 is coming closer to private objects.

As described above, each object on the display surface shall have permissions like view, move and delete that relate to different users. In order to decide if a person has a permission to look at a certain object, the persons need to be identified. An iris identification is used as it is very secure, stable over time and unique for every person. Furthermore, no physical contact between the person and the user equipment is required. Iris identification can be performed using visual light, infrared light or a combination. In order to determine where a person is looking at, a gaze tracking is needed. Using one or more infrared light sources and a corresponding camera sensitive in the infrared spectrum delivers very good gaze tracking. Corneal reflections from the infrared light sources together with the center position of the pupil may be used to estimate the gaze position. If the person has been identified by the above-described iris identification, it is possible to safe and retrieve calibration data to be used for the gaze tracking. In case the user cannot be identified by the system, no user specific calibration data may be available for the gaze tracking. However, estimating a gaze position with lower accuracy and precision is still possible.

Based on the identification of the person, object-specific permissions are determined. In combination with the gaze position, the object may be concealed if necessary.

In the above-described user equipment 1 of FIG. 1, nine infrared light emitting diodes and two infrared cameras are used for iris identification and gaze tracking. Using multiple infrared light sources may reduce corneal reflections in iris identification. Using multiple cameras enables the gaze tracking and the iris identification to work well over large horizontal distances. However, the number of infrared light sources and infrared cameras described above is only an example and may be varied in a wide range.

The invention claimed is:

1. A method for operating a display of a user equipment, wherein the display of the user equipment is configured to display an object, wherein a permission is assigned to the object, the permission defining an allowance for a person to view the object, the method comprising:
   determining a gaze position of a person looking at the display, the gaze position defining a position on the display at which the person is looking;
   determining a distance between the gaze position and a position of the object;
   capturing an image of an iris of the person;
   determining an identifying information for the person based on the image of the iris;
   determining if the person is allowed to view the object based permission assigned to the object and the identifying information for the person; and
   if the person is not allowed to view the object, concealing the object depending on the determined distance between the gaze position and the position of the object, wherein concealing the object comprises blurring the object, wherein a degree of the blurring is a monotonic function of the distance between the gaze position and the position of the object, wherein the degree of blurring increases when the distance becomes smaller.

2. The method according to claim 1, further comprising:
   determining a gaze area radius based on the gaze position and a predefined sharp vision viewing angle of the person, wherein the object is concealed when the distance between the gaze position and the position of the object is smaller than the gaze area radius.

3. The method according to claim 1, wherein the gaze position is the position on the display which is in the visual centre of the person looking at the display.

4. The method according to claim 1, wherein capturing the image of the iris of the person comprises:
   illuminating an eye of the person with light of a predetermined spectrum.

5. The method according to claim 4, wherein the predetermined spectrum comprises an infrared light.

6. The method according to claim 1, wherein capturing the image of the iris of the person comprises:
   illuminating the eye of the person subsequently from a plurality of different directions,
   capturing subsequently a plurality of images of the iris of the person while the eye of the person is illuminated from the plurality of different directions, and
   determining the image of the iris by combining the captured plurality of images.

7. The method according to claim 1, wherein determining the gaze position of the person looking at the display comprises:
   capturing an image comprising light reflected from a corneal of an eye of the person, and
   determining a centre position of a pupil of the eye in the corneal image.

8. The method according to claim 1, wherein the object comprises at least one of a group comprising:
   a photo,
   a video, and
   a document.

9. The method according to claim 1, wherein the method is automatically performed by the user equipment.

10. A user equipment, comprising:
   a display configured to display an object, wherein a permission is assigned to the object, the permission defining an allowance for a person to view the object;
   a capturing device for capturing an image of an eye of a person looking at the display; and
   a processing unit configured to:
      determine a gaze position of the person looking at the display based on the captured image of the eye of the person, the gaze position defining a position on the display at which the person is looking,
      determine a distance between the gaze position and a position of the object,
      capture an image of an iris of the person,
      determine an identifying information for the person based on the image of the iris,
      determine if the person is allowed to view the object based permission assigned to the object and the identifying information for the person, and
      if the person is not allowed to view the object, conceal the object depending on the determined distance between the gaze position and the position of the object wherein concealing the object comprises blurring the object, wherein a degree of the blurring is a monotonic function of the distance between the gaze position and the position of the object, wherein the degree of blurring increases when the distance becomes smaller.

11. The user equipment according to claim 10, wherein the user equipment comprises at least one device of a group comprising a mobile telephone, a smart phone, a personal digital assistant, a mobile media player, a tablet computer, a projector device, a television set, and a portable computer.

* * * * *